United States Patent [19]
Pecone et al.

[11] Patent Number: 5,933,616
[45] Date of Patent: Aug. 3, 1999

[54] MULTIPLE BUS SYSTEM BUS ARBITRATION ACCORDING TO TYPE OF TRANSACTION REQUESTED AND THE AVAILABILITY STATUS OF THE DATA BUFFER BETWEEN THE BUSES

[75] Inventors: Victor K. Pecone; Jay R. Lory, both of Austin, Tex.

[73] Assignee: Dell USA, L.P., Round Rock, Tex.

[21] Appl. No.: 08/895,661

[22] Filed: Jul. 17, 1997

Related U.S. Application Data

[62] Division of application No. 08/570,426, Dec. 11, 1995, abandoned.

[51] Int. Cl.$^6$ .......................... G06F 13/36; G06F 13/38; G06F 13/40
[52] U.S. Cl. .......................... 395/309; 395/308; 395/293
[58] Field of Search .................... 395/306–309, 395/293, 728–729

[56] References Cited

U.S. PATENT DOCUMENTS

| | | | |
|---|---|---|---|
| 5,548,730 | 8/1996 | Young et al. | 395/280 |
| 5,555,383 | 9/1996 | Elazar et al. | 395/306 |
| 5,619,661 | 4/1997 | Crews et al. | 395/299 |
| 5,632,021 | 5/1997 | Jennings et al. | 395/309 |
| 5,664,122 | 9/1997 | Rabe et al. | 395/308 |
| 5,721,839 | 2/1998 | Callison et al. | 395/308 |

*Primary Examiner*—Ayaz R. Sheikh
*Assistant Examiner*—Sumati Lefkowitz
*Attorney, Agent, or Firm*—Skjerven, Morrill, MacPherson, Franklin & Friel, L.L.P.

[57] ABSTRACT

A computer system is provided wherein a bus master generates a signal indicative of the type of cycle it plans to initiate when requesting bus ownership. Other bus masters may be configured to generate similar cycle-type signals. A bus arbiter samples each master's unique cycle type signal during the request phase, and further receives information regarding the status of various target resources. Based upon the cycle type signals from requesting masters and upon the target resource information, the bus arbiter determines whether a master is planning to access an unavailable target resource. A master that is planning to access an unavailable target resource will be denied access of the bus. Accordingly, other masters intending to initiate cycles to available target resources may be granted ownership of the bus. As a result, target termination retry cycles may be avoided, and bus bandwidth and overall system performance may be improved.

8 Claims, 5 Drawing Sheets

MULTIPLE BUS SYSTEM BUS ARBITRATION ACCORDING TO TYPE OF TRANSACTION REQUESTED AND THE AVAILABILITY STATUS OF THE DATA BUFFER BETWEEN THE BUSES

This is a Division of application Ser. No. 08/570,426 filed Dec. 11, 1995, now abandoned.

BACKGROUND OF THE INVENTION

1. Field of the Invention

This invention relates to computer systems and more particularly to arbitration mechanisms for determining and prioritizing ownership of a bus among several masters in a computer system.

2. Description of the Relevant Art

Computer architectures generally include a plurality of devices interconnected by one or more buses. For example, conventional computer systems typically include a CPU coupled through bridge logic to a main memory. The bridge logic also typically couples to a high bandwidth local expansion bus, such as the Peripheral Component Interconnect (PCI) bus or the VESA (Video Electronics Standards Association) VL bus. Modern local bus standards such as the PCI bus and the VL bus are not constrained by a requirement to be backwards compatible with prior expansion bus adapters and thus provide much higher throughput than older expansion buses. Examples of devices which can be coupled to local expansion buses include SCSI adapters, network interface cards, video accelerators, audio cards, telephony cards, etc. An older-style expansion bus may also be coupled to the local expansion bus to provide compatibility with earlier-version expansion bus adapters. Examples of such expansion buses include the industry standard architecture (ISA) bus, also referred to as the AT bus, the extended industry standard architecture (EISA) bus, and the micro-channel architecture (MCA) bus. Various devices may be coupled to this second expansion bus, including a fax/modem, sound card, etc.

When two or more masters reside on a particular bus, arbitration logic is typically required to determine and prioritize ownership of the bus. For example, a CPU local bus arbiter as well as a PCI bus arbiter are typically included as part of the bridge logic in many computer systems. In the PCI bus architecture each bus master has two unique side band signals for master arbitration. These signals are REQ (request for mastership) and GNT (granted mastership). The CPU local bus arbiter within a typical computer system determines and prioritizes ownership of the CPU local bus, while the PCI bus arbiter determines and prioritizes ownership of the PCI bus. Mastership of either bus is typically based on a fixed arbitration fairness scheme, such as a round-robin algorithm. The arbitration scheme is typically not based upon the status of the target devices for which access is sought, nor upon the type of cycle the master plans to initiate. Thus, the arbiter may grant ownership of the bus even though the requesting master is attempting to access a target resource which is unavailable to accommodate the data transfer. In such situations, a target termination retry cycle or an abort cycle must be initiated, and the master must wait until a later time to perform its desired operation.

It is common in high performance embedded controller applications for the controller to act as a bus master. Exemplary embedded controllers include disk array controllers and network interface controllers. In an embedded controller, a central arbiter typically controls each master's request REQ/GNT handshake and, similar to the previous discussion, prioritizes mastership of the controller's local busses based on an arbitration fairness scheme. The central arbiter is usually an integral part of the host memory controller interface and may have knowledge of the PCI to memory buffer status. However, the arbiter will grant a requesting master bus ownership without knowledge of the specific bus cycle the master plans to initiate. Again, a target termination retry cycle or an abort cycle may be required if the target resource to be accessed is unavailable when the arbiter grants ownership of the bus.

For example, consider a situation within an embedded controller wherein two PCI bus masters are requesting bus ownership simultaneously. One of the masters plans to effectuate a memory read, and the other master plans to effectuate a memory write. For this example, it is assumed that the PCI memory controller's prefetch buffer is not empty (i.e., it contains data that is targeted to another PCI device) and that the write posting buffer is empty. If the central arbiter grants ownership to the master who plans to do a memory read first based purely on a fairness algorithm, the master will initiate the memory read only to be stopped via a PCI target termination retry cycle by the memory target since the prefetch buffer is not empty. The occurrence of such operations may significantly degrade bus bandwidth and may therefore undesirably affect the overall performance of the computer system.

SUMMARY OF THE INVENTION

The problems outlined above are in large part solved by a computer system employing a bus master arbitration descriptor mechanism and method in accordance with the present invention. In one embodiment, a computer system is provided wherein a bus master generates a signal indicative of the type of cycle it plans to initiate when requesting bus ownership. Other bus masters may be configured to generate similar cycle-type signals. A bus arbiter samples each master's unique cycle type signal during the request phase, and further receives information regarding the status of various target resources. Based upon the cycle type signals from requesting masters and upon the target resource information, the bus arbiter determines whether a master is planning to access an unavailable target resource. A master that is planning to access an unavailable target resource will be denied access of the bus. Accordingly, other masters intending to initiate cycles to available target resources may be granted ownership of the bus. As a result, target termination retry cycles may be avoided, and bus bandwidth and overall system performance may be improved.

In one implementation, the bus master arbitration descriptor mechanism is employed within an embedded disk array controller. The embedded controller includes a host PCI interface coupled to a host PCI bus, and a local PCI interface coupled to a local PCI bus. A data buffer (or data queue) is coupled between the host PCI interface and the local PCI interface to accommodate data transfers therebetween. A secondary bus ("Xbus") controller is also coupled between the host and local PCI interfaces. The host PCI interface may effectuate data transfers with the data buffer or with the secondary bus controller via a bus referred to as the "host Ubus". Similarly, the local PCI interface may effectuate data transfers with the data buffer or with the secondary bus controller via a bus referred to as the "local Ubus". A DMA controller may be coupled to both the host Ubus and the local Ubus.

The host PCI interface generates a cycle type signal indicative of the type of transfer it plans to initiate when requesting ownership of the host Ubus. Similarly, the local PCI interface generates a cycle type signal indicative of the type of transfer it plans to initiate when requesting ownership of the local Ubus. The cycle type information conveyed by each PCI interface indicates whether the respective master plans to initiate a read of the internal data buffer, a write to the internal data buffer, a read of the Xbus, or a write to the Xbus.

The Xbus controller can only handle single master access at any given moment, and asserts an Xbus busy signal when it is currently servicing a master. A central bus arbiter is employed to control ownership of the host Ubus and the local Ubus. The bus arbiter receives information indicative of whether the data buffer contains data to be transferred to the host PCI interface or data to be transferred to the local PCI interface. Using this information, along with the busy signal from the secondary bus controller and the cycle type signals, the bus arbiter denies access to a master if it is intending to initiate a cycle directed to an unavailable target resource. For example, if the Xbus busy signal is asserted, the host PCI interface will be denied access to the host Ubus if its cycle type signal indicates that it is planning to initiate a cycle directed to the Xbus, and the local PCI interface is denied access to the local Ubus if it is planning to initiate a cycle to the Xbus. Similarly, if the data buffer contains data to be transferred to the host PCI contains data to be transferred to the host PCI interface, access by the host PCI interface to the host Ubus is denied if the host PCI interface is intending to perform a data buffer read operation, and access by the local PCI interface to the local Ubus will be denied if the local PCI interface is intending to perform a write to the data buffer. Finally, if the data buffer contains data to be transferred to the local PCI interface, access by the local PCI interface to the local Ubus will be denied if the local PCI interface is intending to perform a data buffer read operation, and access by the host PCI interface to the host Ubus will be denied if the host PCI interface is intending to perform a write to the data buffer.

BRIEF DESCRIPTION OF THE DRAWINGS

Other objects and advantages of the invention will become apparent upon reading the following detailed description and upon reference to the accompanying drawings in which.

Figure 1:
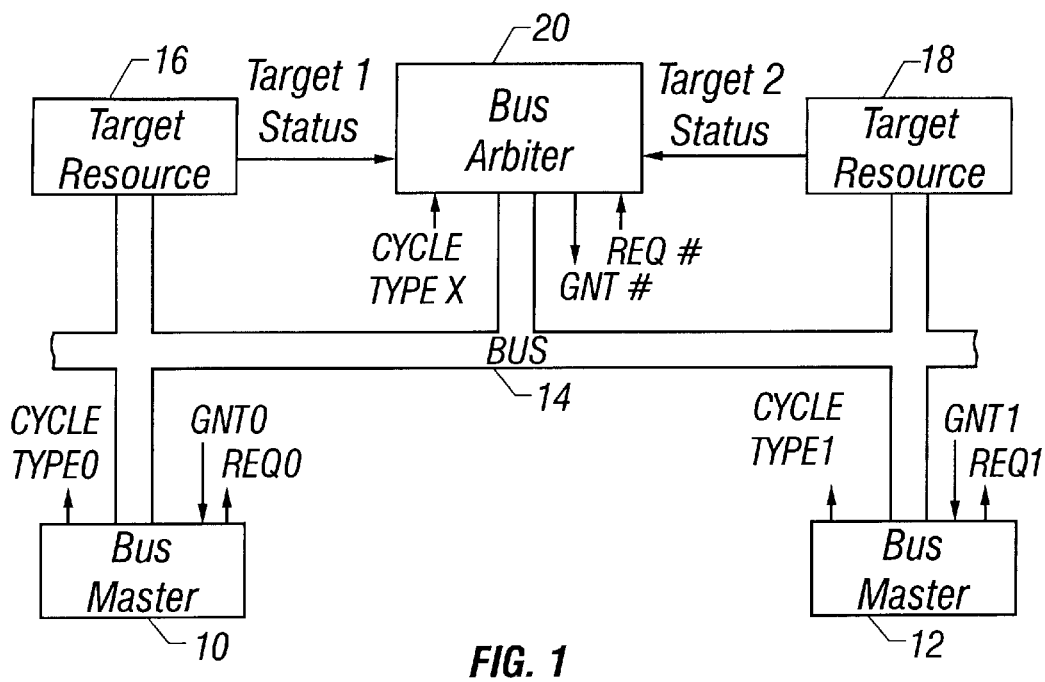
FIG. 1 is a block diagram of a computer system employing an arbitration mechanism in accordance with one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a block diagram of a computer system employing an arbitration mechanism in accordance with one embodiment of the present invention. FIG. 1 illustrates a pair of bus masters 10 and 12 and a pair of target resources 16 and 18 coupled to a bus 14. A bus arbiter 20 is further shown coupled to bus 14 and to target resources 16 and 18.

Bus masters 10 and 12 are each generally illustrative of a variety of bus mastering devices, including for example a main CPU, a network interface card, a video adapter, a disk controller, and a bus interface controller, among others. Target resources 16 and 18 are similarly illustrative of a variety of target devices, including memory controllers, storage devices, and embedded controllers, among others. It is noted that any of the bus devices of FIG. 1 may serve as both master and slave resources.

Bus 14 is illustrative of, for example, a PCI (peripheral component interconnect) bus. It is specifically contemplated, however, that the invention may employed in conjunction with other bus standards such as the EISA bus or the VESA bus standards.

Bus arbiter 20 is provided to arbitrate and control the ownership of bus 14 among mastering devices, including bus masters 10 and 12, that reside on bus 14. For a PCI bus implementation, bus arbiter 20 receives a unique request signal REQ# from each bus master device. For example, FIG. 1 illustrates a request signal REQ0 which is generated by bus master 10, and a request signal REQ1 which is generated by bus master 12. When a particular bus master requires ownership of bus 14, it asserts its associated request signal REQ#. Generally speaking, bus arbiter 20 processes the incoming request signals REQ# and indicates the granting of ownership of bus 14 by asserting a grant signal GNT# provided to the selected master. It is noted that, similar to the request signals REQ#, each bus master is associated with a unique grant signal GNT#.

In accordance with the invention, each bus master 10 and 12 is also configured to generate a cycle type signal CYCLETYPE# at the same time it is requesting the bus (i.e., when it asserts its REQ# signal). In this embodiment, a separate cycle type signal CYCLETYPE# is generated by each master (i.e., bus master 10 generates a cycle type signal CYCLETYPE0 and bus master 12 generates a cycle type signal CYCLETYPE1, etc.). The cycle type signal of each master describes the type of cycle the master plans to initiate on bus 14 prior to receiving ownership from the bus arbiter 20. This will be explained in further detail below.

The bus arbiter 20 is configured to detect the cycle type signal CYCLETYPE# of a bus master when its associated request signal REQ# is asserted. Bus arbiter 20 is further coupled to receive information indicative of the status of each of the target resources 16 and 18. In one embodiment, the information (labelled "Target1 Status" and "Target2 Status") received from each target resource indicates whether the target is currently available to be read and/or written. The cycle type signal CYCLETYPE# generated by each master indicates the specific target resource 16 or 18 to be accessed during a given cycle, and whether the target is to be read or written. Based upon this information, the bus arbiter 20 determines whether the target specified by a particular master requesting the bus is available to service the operation indicated by the associated cycle type signal. If the status information received by bus arbiter 20 indicates that the particular target resource will not be capable of servicing the request, mastership of the bus will not be granted to the master. Accordingly, latencies associated with target termination retry cycles may be avoided, and the bus is kept free to accommodate other bus masters that require access to resources that are currently available. overall improved bus bandwidth may thus be attained.

For example, consider a situation wherein bus master 10 is requesting access to bus 14 and the corresponding cycle type signal CYCLETYPE0 indicates that bus master 10 is intending to perform a read operation associated with target resource 16. At the same time, bus master 12 is requesting access to bus 14. The cycle type signal CYCLETYPE1 of bus master 12 indicates that its desired operation is a write operation to target resource 18. For this situation, if the target status information from target resource 16 indicates that it is unavailable or is incapable of currently servicing a read operation, and if the target status information from target resource 18 indicates that it is currently available to service a write operation, bus arbiter 20 will grant mastership of bus 14 to bus master 12. Accordingly, bus master 12 will be allowed to effectuate its write operation, and bus master 10 will continue to request the bus until a later time when target resource 16 is available to service a read operation.

Conversely, if the target status information from target resource 18 indicates that it is currently unavailable to service a write operation and if the target: status information from target resource 16 indicates it is available to service a read operation, bus arbiter 20 grants mastership of the bus 14 to bus master 10. In this manner, latencies associated with target termination retry cycles or other cycle abort operations can be avoided, and bus access is given to a bus master which is planning to initiate a transaction to an available target resource.

It is noted that while in the embodiment of FIG. 1 the target status information provided from target resources 16 and 18 indicates whether each target resource is currently available to service a read or a write request, alternative configurations are possible wherein other specific status information is provided by the target resources. The target status information may constitute other types of information indicative of whether a target resource is available to service a predetermined operation.

It is also noted that, while it is preferable that each master residing on bus 14 be configured to generate an associated cycle type signal indicative of the type of operation it plans to initiate, certain masters may not be configured to generate a cycle type signal. In addition, the information conveyed by the cycle type signal of a particular master may indicate only the target resource it intends to access, or may indicate only whether a read or a write operation is intended. Finally, it is noted that when multiple masters are requesting access to available target resources (or when a master is requesting access to an available target resource and contends with a master not configured to generate a cycle type signal), bus arbiter 20 may arbitrate the contending requests based on a fairness scheme, such as a round-robin algorithm.

Figure 2:
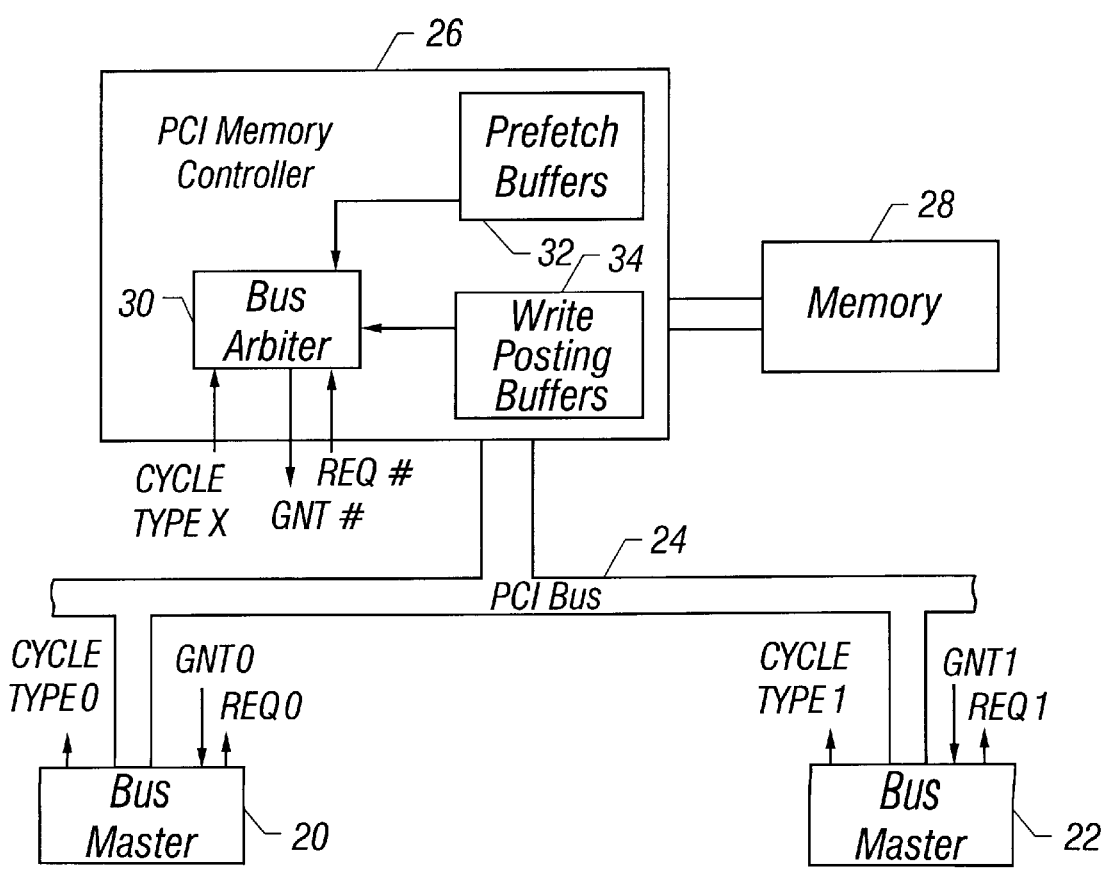
FIG. 2 is a block diagram of a portion of a computer system including a memory controller in accordance with another embodiment of the invention.

Turning next to FIG. 2, a block diagram of a portion of a computer system in accordance with another embodiment of the invention is shown. FIG. 2 illustrates a pair of bus masters 20 and 22 coupled to a bus 24. A memory controller 26 is coupled between bus 24 and a memory 28. Memory controller 26 includes a central bus arbiter 30 coupled to prefetch buffers 32 and write posting buffers 34. It is noted that memory controller 26 further includes other conventional circuitry which has been omitted from the drawing for simplicity and clarity.

Similar to the embodiment of FIG. 1, bus masters 20 and 22 are representative of a variety of specific bus mastering devices, and bus 24 is illustrative of, for example, a PCI bus. It is further understood that memory controller 26 may be coupled through an additional port to a system CPU.

Prefetch buffers 32 are provided to buffer data being read from main memory 28. Similarly, write posting buffers 34 are provided to buffer data being written into main memory 28. In this manner, a fast interface is provided for accessing the slower main memory 28. Prefetch buffers 32 and write posting buffers 34 may each have capacities of storing a single data word or of storing multiple data words, as desired. For example, in one embodiment, prefetch buffers 32 and write posting buffers 34 are each capable of storing a line of data read from or to be written to, respectively, memory 28.

Prefetch buffers 32 and write posting buffers 34 are target resources. Each of the bus masters 20 and 22 are configured to generate a cycle type signal CYCLETYPE# indicative of the type of cycle it intends to effectuate. For example, for the embodiment of FIG. 2, each cycle type signal indicates whether the associated master is going to perform a read or a write operation with respect to memory 28. Bus arbiter 30 receives status information from the prefetch buffers 32 and the write posting buffers 34 indicative of whether either contains data to be transferred in a pending transaction. Based upon this information, bus arbiter 30 grants ownership of bus 24 to a master requesting a transfer to an available resource in favor of a contending master requesting access to an unavailable resource.

For example, consider a situation wherein bus master 20 is requesting ownership of bus 24, and its cycle type signal indicates that the requested operation is a memory write operation. In this situation, bus arbiter 30 will not grant bus mastership to bus 20 if write posting buffers 34 currently contain data to be transferred to memory 28. Accordingly, bus master 20 must wait until after the write posting buffers 34 have been emptied before it can complete the cycle. In the mean time, if a contending request is initiated by bus master 22, and if the bus request signal for bus master 22 indicates that the request operation is for a memory read, the bus arbiter 30 will grant mastership of bus 24 to bus master 22 if prefetch buffers 22 are empty. Bus arbiter 30 operates similarly for masters intending to perform read operations if prefetch buffers 32 contain data to be transferred in a pending transaction. As a result, data transfers may be effectuated expeditiously, and mastership of the bus 24 is not granted to a bus master, only to have memory controller 26 initiate a target termination retry cycle because the target resource (i.e., prefetch buffers 32 or write posting buffers 34) was not available to receive the data to be transferred.

Figure 3:
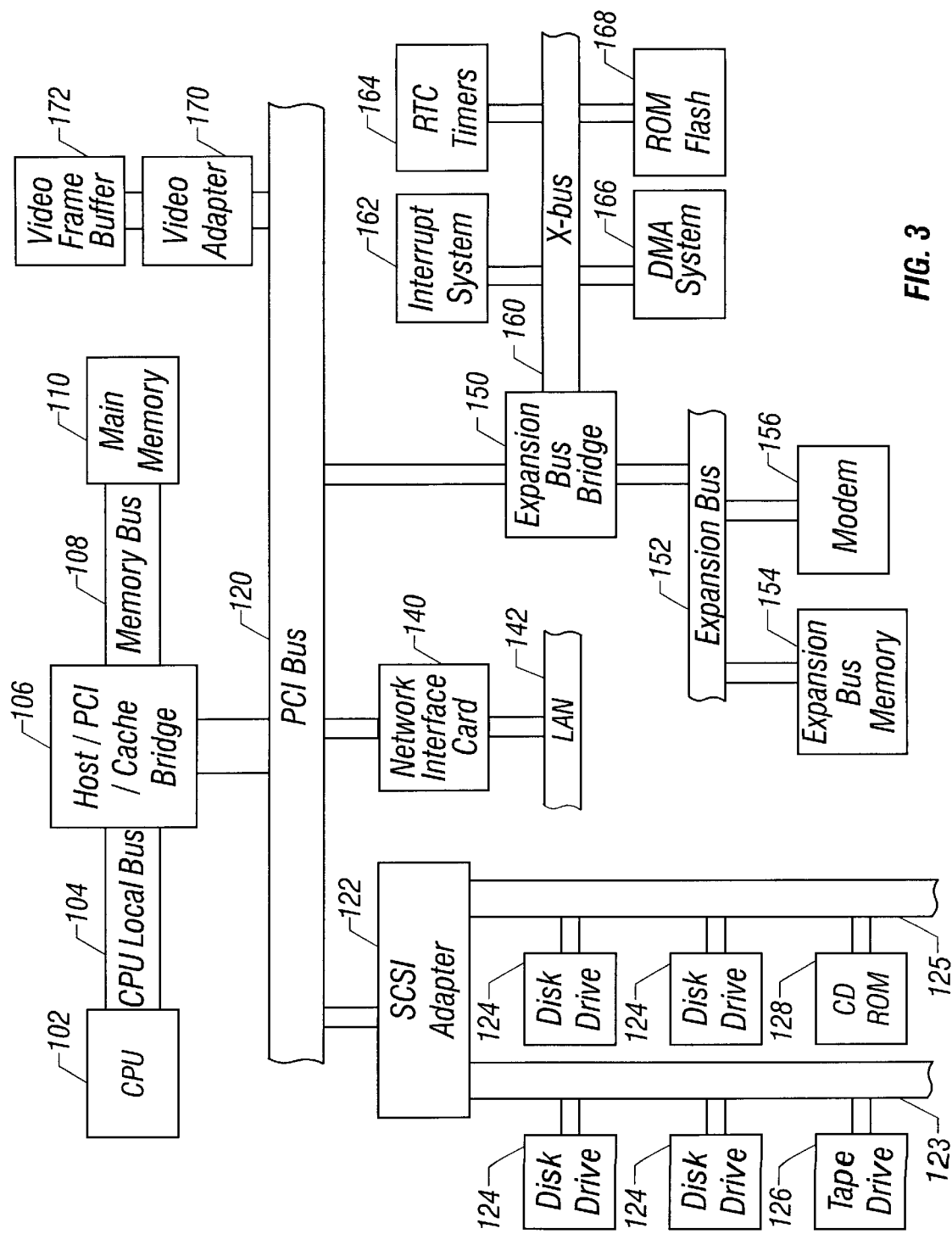
FIG. 3 is a block diagram of a computer system including an expansion bus adapter implementing a disk array controller in accordance with another embodiment of the invention.

Turning next to FIG. 3, a block diagram of a computer system in accordance with yet another embodiment of the present invention is shown. As shown, the computer system includes a central processing unit (CPU) 102 which is coupled through a CPU local bus 104 to a host/PCI/cache bridge or chipset 106. The bridge or chipset 106 is preferably the Triton chipset available from Intel Corporation.

The bridge 106 couples through a memory bus 108 to main memory 110. The host/PCI/cache bridge 106 also interfaces to a peripheral component interconnect (PCI) bus 120. In the preferred embodiment, a PCI local bus is used.

However, it is noted that other local buses may be used, such as the VESA (Video Electronics Standards Association) VL bus.

Various types of devices may be connected to the PCI bus 120, including one or more bus masters and one or more target devices. In the embodiment shown in FIG. 1, a video adapter 170 and video frame buffer 172 are coupled to the PCI bus 120 for controlling video functions. A SCSI (small computer systems interface) adapter 122 is also coupled to the PCI bus 120. In the preferred embodiment, the SCSI adapter 122 is a SCSI disk controller which includes two SCSI channels 123 and 125. Each of the SCSI channels 123 and 125 include eight disk drive units 124 forming a disk array. As will be explained in further detail, SCSI adapter 122 includes an arbitration mechanism according to the present invention which determines bus ownership depending upon the type of cycle a master plans to effectuate and upon the availability of the corresponding target resources. Various other devices may be connected to the PCI bus 120, such as a network interface card 140. As shown, the network interface card 140 interfaces to a local area network (LAN) 142.

Expansion bus bridge logic 150 is also preferably coupled to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156. The expansion bus bridge logic 150 also couples to a peripheral expansion bus referred to as the X-bus 160. The X-bus 160 is used for connecting various peripherals to the computer system. As shown, an interrupt system 162, a real time clock (RTC) and timers 164, a direct memory access (DMA) system 166, and ROM/Flash memory 168 are coupled to the X-bus 160. Other peripherals (not shown) are preferably connected to the X-bus 160, including communications ports, diagnostics ports, command/status registers, non-volatile static random access memory (NVSRAM) etc.

Figure 4:
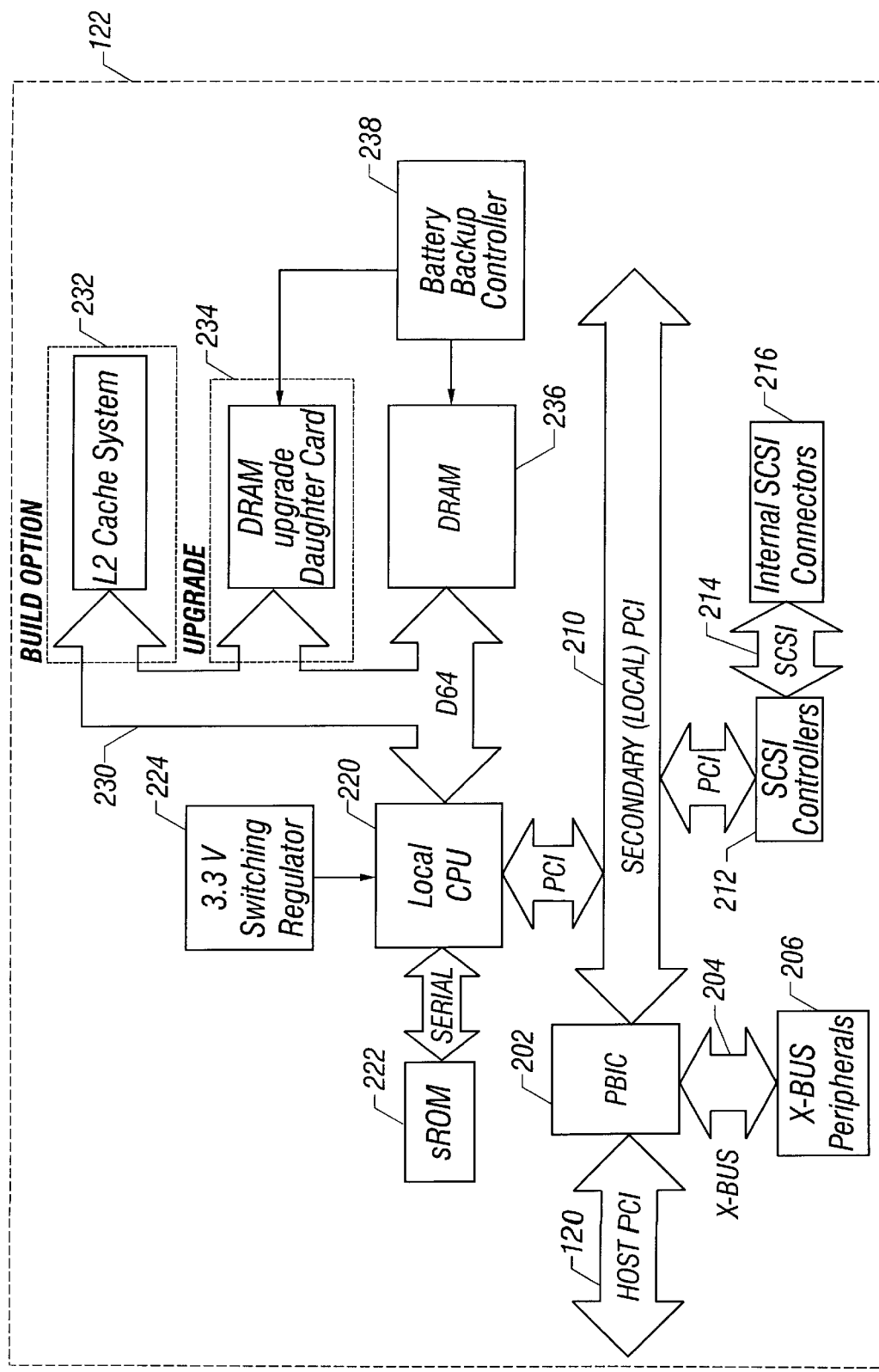
FIG. 4 is a block diagram of the expansion bus adapter of FIG. 3.

Referring now to FIG. 4, a block diagram illustrating the SCSI adapter 122 of FIG. 3 is shown. In one embodiment, SCSI adapter 122 is configured to operate as a caching disk array controller, and may implement one of several RAID (redundant array of inexpensive disks) levels. As shown, the SCSI adapter 122 includes a PCI bus interface chip (PBIC) 202, which couples to the host or primary PCI bus 120. As will be explained in further detail below, PBIC 202 includes an arbitration mechanism according to an embodiment of the present invention. The PBIC 202 interfaces through a second X-bus 204 to various X-bus peripherals 206 as shown. The various X-bus peripherals 206 may include a DMA system, interrupt system, timers, a real time clock (RTC), configuration ports, diagnostic ports, command/status registers, ROM/Flash memory, and non-volatile SRAM (NVSRAM) (all not shown).

The PBIC 202 also couples to a secondary PCI bus 210. SCSI controllers 212 are coupled to the secondary PCI bus 210. The SCSI controllers 212 in turn couple through a SCSI bus 214 to internal SCSI connectors 216. In one embodiment, two SCSI controllers are incorporated into block 212, and the SCSI bus 214 comprises the two SCSI channels 123 and 125. The internal SCSI connectors 216 are for attaching various devices, such as the disk drives 124, as shown in FIG. 1.

A local CPU 220 is coupled to the secondary PCI bus 210. The local CPU 220 may be any of a variety of types. In one embodiment, the local CPU 220 is the PowerPC microprocessor produced by Motorola, IBM and Apple. In an alternate embodiment, the local CPU 220 is the Alpha chip from Digital Equipment Corporation (DEC). The local CPU 220 couples through a serial bus to an SROM 222. The local CPU 220 receives power from a 3.3 V switching regulator 224, as shown. The local CPU 220 includes a 64 bit data path which couples through a 64-bit data bus 230. Dynamic random access memory (DRAM) 236 is coupled to the 64-bit data bus 230. The DRAM 236 stores a plurality of layers of drivers executed by the local CPU 220 to service host requests.

The 64-bit data bus 230 also includes a connection for coupling to an optional dynamic random access memory (DRAN) upgrade daughter card 234. An optional second level or L2 cache system 232 may also be coupled to the 64-bit data bus 230. The DRAM upgrade daughter card 234 and the L2 cache system 232 are shown in dotted lines and are options that are included in the preferred embodiment, but may be left out as desired. A battery backup controller 238 is coupled to each of the DRAM 236 and the DRAM upgrade daughter card 234. The local PCI bus 210 also includes a daughter card option for additional SCSI connections. As shown, additional PCI controllers 250 may be coupled to the local PCI bus 210 through a daughter card PCI bus as shown. The PCI controllers 250 couple through additional SCSI channels 252 to respective external SCSI connectors 254, as shown.

Figure 5A:
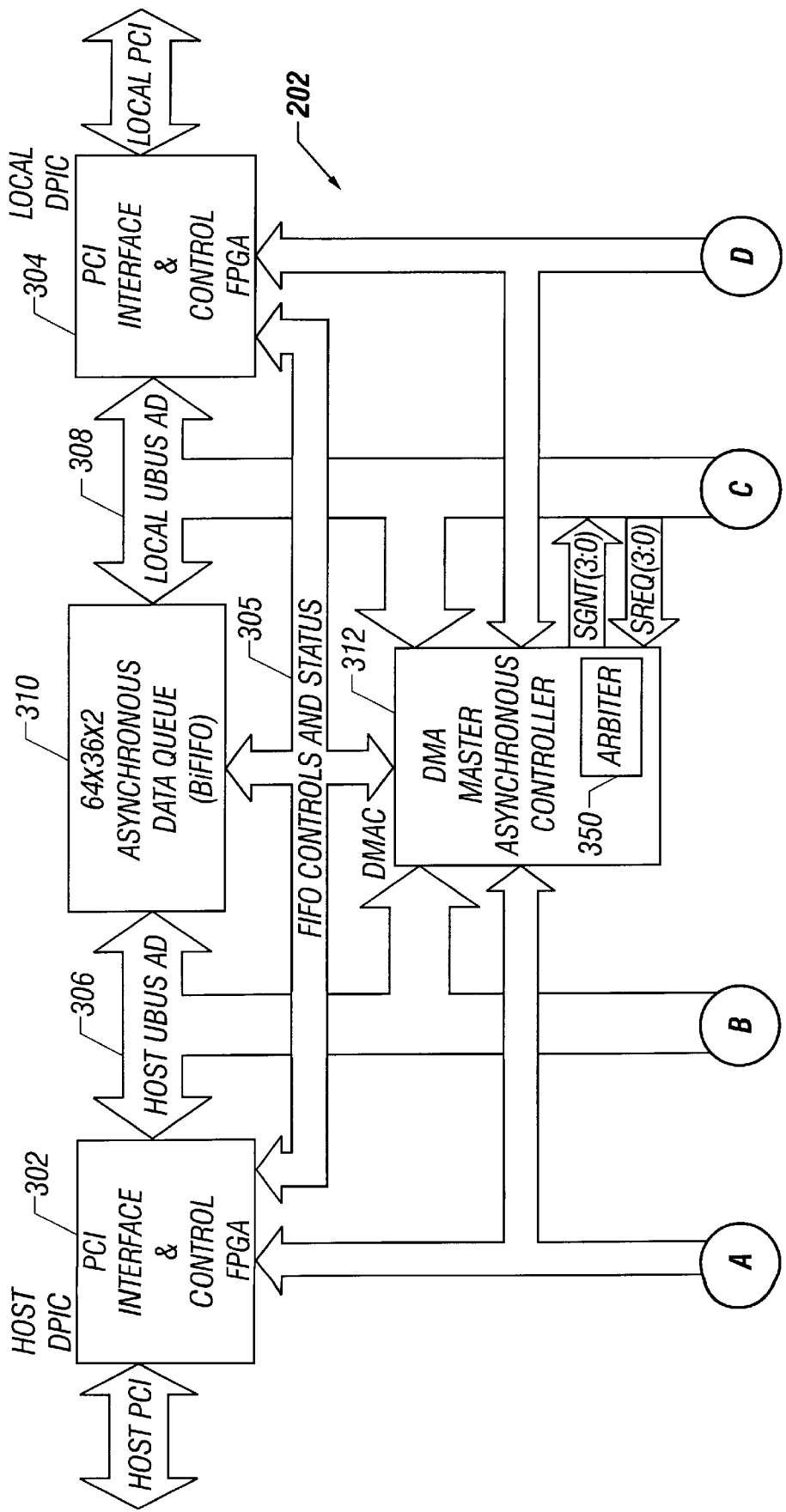
FIG. 5 is a block diagram of the PCI to PCI bus interface unit of FIG. 4.
Figure 5B:
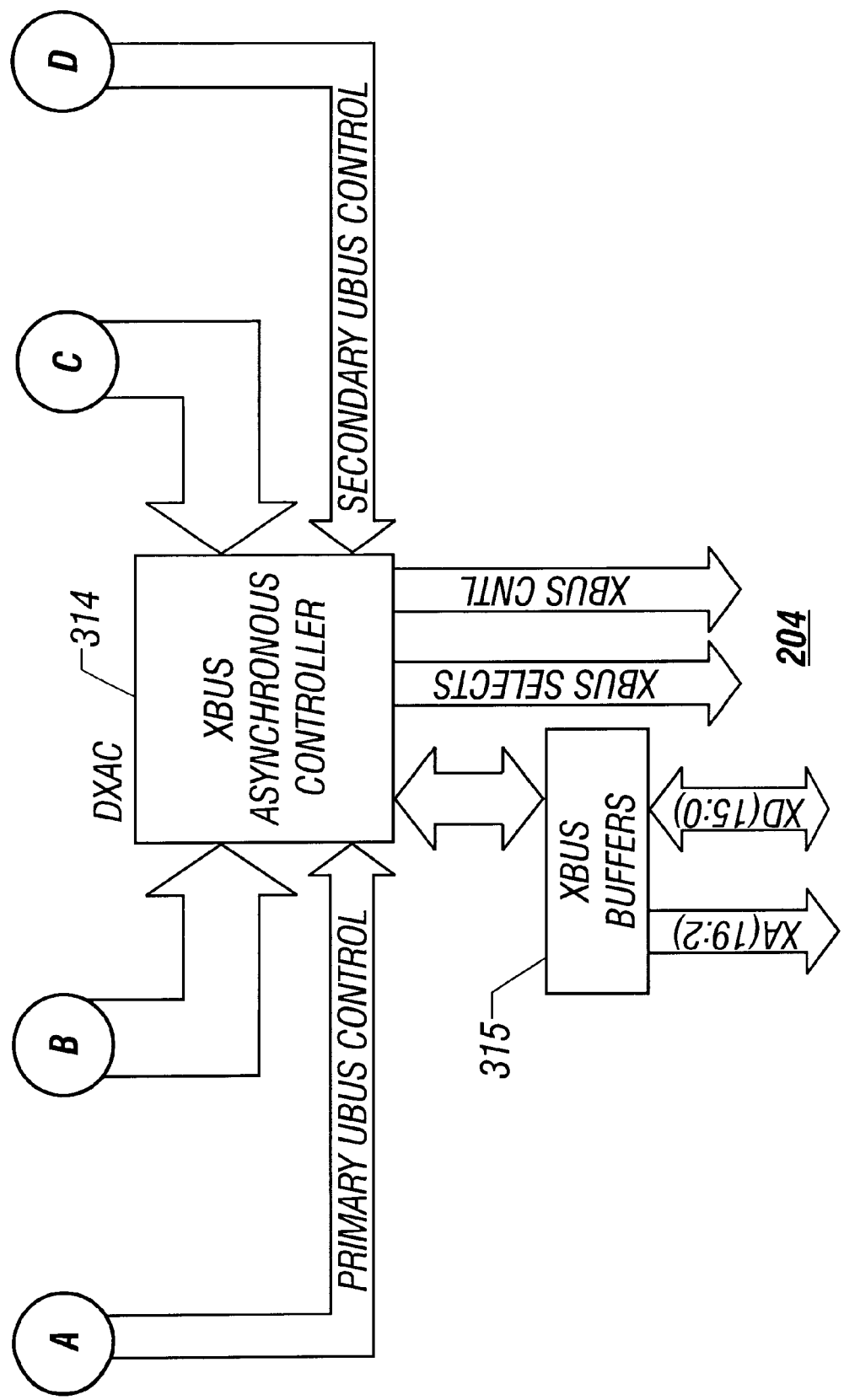

Referring now to FIG. 5, a block diagram illustrating a design of the PCI bus interface controller (PBIC) 202 is shown. The PBIC 202 includes a primary PCI interface 302, referred to as a host DPIC (dual PCI interface controller) and a secondary PCI interface 304, referred to as a local DPIC (dual PCI interface controller). As shown, the host PCI interface 302 interfaces to the host PCI bus 120. The local PCI interface 304 interfaces to the local PCI bus 210. The host PCI interface 302 and local PCI interface 304 interface to each other via a control and status bus 305 as shown. The host PCI interface 302 also provides various bus signals over a bus referred to as Ubus 306, including address and data signals. Likewise, the local PCI interface 304 provides bus signals, including address and data signals, over a bus referred to as Ubus 308.

Data queue 310 is coupled between bus 306 and bus 308 to allow data communication between the host. PCI interface 302 and the local PCI interface 304. A DMA (direct memory access) Master Asynchronous Controller (DMAC) 312 is coupled between each of the buses 306 and 308, and the host PCI interface 302 and local PCI interface 304 provide their respective bus signals to the DMAC 312 as shown. DMAC 312 controls data transfers into and out of data queue 310.

The host PCI interface 302 and local PCI interface 304 also each provide their respective bus signals over buses 306 and 308 to an Xbus Asynchronous Controller (DXAC) 314. The DXAC 314 interfaces through Xbus buffers 315 to the peripheral Xbus 204 (of FIG. 4). As mentioned above, various peripheral devices (not shown) may be connected to the peripheral bus 204, including an interrupt subsystem, a real time clock, various timers, ROM/Flash memory, non-volatile SRAM, communication ports, diagnostic ports, command/status registers, etc.

The PBIC 202 forms a high performance host PCI to local PCI bus controller interface. The PBIC architecture includes a symmetrical design for sharing DMA controller and peripheral extension bus (X-bus) resources between each PCI side. The host PCI interface 302 and local PCI interface 304 provide master/slave interfaces between each P01 side. The PCI interfaces 302 and 304 symmetrically interface to the data queue 310 and the DMAC 312 for DMA and/or burst cycles.

DMAC 312 includes an arbiter 315 which arbitrates ownership of host Ubus 306 and of local Ubus 308. The DMAC 312 allows for bus access concurrency from each Ubus side. Accordingly, both host DPIC 302 and local DPIC 304 can simultaneously be involved in a transfer with data queue 310. DXAC 314 can only handle single master access at a given moment.

When host DPIC 302 requires mastership of host Ubus 306, it asserts a request signal UREQ0 which is received by arbiter 350. Local DPIC 304 similarly asserts a request signal UREQ1 to request ownership of local Ubus 308. Arbiter 350 indicates a grant of ownership of host Ubus 306 to host DPIC 302 by asserting a grant signal UGNT0, and indicates a granting of ownership of local Ubus 308 to local DPIC 304 by asserting a grant signal UGNT1. The DXAC 314 generates a signal "Xbus busy signal" which is further received by arbiter 350. DXAC 314 asserts the Xbus busy signal during an active Xbus cycle.

The following signals comprise the arbitration control for each Ubus. It is noted that one set of the signals is provided for the host Ubus side, and another set is provided for the local Ubus side.

| Signal Name | DPIC | DMAC | DXAC | Description |
| --- | --- | --- | --- | --- |
| U-REQn | out | in | n/c | DPIC master request to DMAC |
| U-GNTn | in | out | n/c | DPIC Ubus mastership granted by DMAC |
| XIDLEn | n/c | in | out | Xbus idle: Driven by the DXAC during an active Xbus cycle. DMAC uses this to determine Xbus arbitration on the Ubus. |

Each DPIC 302 and 304 further generates a two-bit cycle type signal (ACYCn 1:0) which indicates the type of transfer to be initiated. Table 2 below illustrates the encoding of the cycle type signal generated by each DPIC.

| ACYC1 | ACYC0 | DPIC | DMAC | Description |
| --- | --- | --- | --- | --- |
| 0 | 0 | out | in | DPIC requesting XBus read |
| 0 | 1 | out | in | DPIC requesting XBus write |
| 1 | 0 | out | in | DPIC requesting Data Queue read |
| 1 | 1 | out | in | DPIC requesting Data Queue write |

Arbiter 350 is configured such that the arbitration of host Ubus 306 is based upon the type of cycle the host DPIC 302 intends to initiate on host Ubus 306, and upon the status of data queue 310 and the status of DXAC 314. Arbiter 350 is similarly configured such that the arbitration of local Ubus 308 is based upon the type of cycle the local DPIC 304 intends to initiate on local Ubus 308, and upon the status of data queue 310 and the status of DXAC 314.

In one implementation, host DPIC 302 is denied ownership of host Ubus 306 by arbiter 350 if its cycle type signal indicates that it is planning to perform an Xbus read or write cycle and if the Xbus busy signal is asserted by DXAC 314.

As stated previously, the Xbus busy signal is asserted by DXAC 314 during an active Xbus cycle. An active Xbus cycle may have resulted from, for example, an access, by local DPIC 304. Ownership of host Ubus 306 by host DPIC 302 when it is planning to initiate a cycle directed to data queue 310 is similarly dependent upon the status of data queue 310. If data queue 310 contains data to be transferred to the host DPIC 302, ownership of host Ubus 306 by host DPIC 302 is denied if host DPIC 302 indicates that it is intending to perform a data queue 310 read operation. Similarly, if data queue 310 contains data to be transferred to the local DPIC 304, ownership of host Ubus 306 by host DFIC 302 is denied if the host DPIC 302 is intending to perform a data queue 310 write operation.

Operation of bus arbiter 350 with respect to the arbitration of local Ubus 308 is similar. The local DPIC 304 is denied ownership of local Ubus 308 by arbiter 350 if its cycle type signal indicates that it is planning to perform an Xbus read or write cycle when the Xbus busy signal is asserted by DXAC 314. Similarly, if data queue 310 contains data to be transferred to the local DPIC 304, ownership of local Ubus 308 by local DPIC 304 is denied if local DPIC 304 indicates that it is intending to perform a data queue 310 read operation. If data queue 310 contains data to be transferred to host DPIC 302, ownership of local Ubus 308 by local DPIC 304 is denied if local DPIC 304 is intending to perform a data queue 310 write operation.

In accordance with the master arbitration descriptor mechanism employed within the PCI to PCI interface of FIG. 5, target termination retry cycles on both Ubuses may be avoided. Accordingly, overall improved performance of the disk array controller may be attained.

Numerous variations and modifications will become apparent to those skilled in the art once the above disclosure is fully appreciated. It is intended that the following claims be interpreted to embrace all such variations and modifications.

What is claimed is:

1. A disk controller for a computer system comprising:
   a first bus;
   a host interface coupled to said first bus for providing an interface between said first bus and a host bus, wherein said host interface is configured to generate a first cycle type signal indicative of a type of transfer and a resource and direction for the transfer to be initiated on said first bus by said host interface;
   a data queue coupled to said first bus and configured to operate as a slave with respect to a predetermined cycle effectuated by said first bus, wherein said data queue is further configured to generate a first status signal indicative of whether said data queue contains data to be transferred in a pending transaction; and
   a bus arbiter for controlling ownership of said first bus among a plurality of bus masters including said host interface, wherein said bus arbiter is coupled to receive said first status signal and said first cycle type signal and is configured to grant ownership of said first bus to said host interface depending upon said first cycle type signal and said first status signal.

2. The disk controller as recited in claim 1 wherein said bus arbiter is configured to deny ownership of said first bus to said host interface if said first cycle type signal indicates that a transfer is pending that involves said data queue and if said first status signal indicates that the data queue is unavailable to participate in said transfer.

3. The computer system as recited in claim 1 wherein said host interface is configured to assert a bus request signal for requesting ownership of said first bus concurrently with generating said first cycle type signal.

4. The computer system as recited in claim 1 wherein said bus arbiter is configured such that arbitration of said first bus is based upon an availability of said data queue and upon said first cycle type signal.

5. A host-to-local bus interface for a computer system comprising:

a host interface coupled to a first bus for providing an interface between said first bus and a host bus, wherein said host interface is configured to generate a first cycle type signal indicative of a type of transfer and a resource and direction for the transfer to be initiated on said first bus by said host interface;

a local interface coupled to a second bus for providing an interface between said second bus and a local bus, wherein said local interface is configured to generate a second cycle type signal indicative of a type of transfer and a resource and direction for the transfer to be initiated on said second bus by said local interface;

a data queue coupled to said first bus and to said second bus and configured to buffer data being transferred between said first bus and said second bus, wherein said data queue is further configured to generate a first status signal indicative of whether said data queue contains data to be transferred in a pending transaction; and a bus arbiter for controlling ownership of said first bus among a plurality of bus masters including said host interface and for controlling ownership of said second bus, wherein said bus arbiter is coupled to receive said first status signal, said first cycle type signal, and said second cycle type signal, and wherein said bus arbiter is configured to grant ownership of said first bus to said host interface depending upon said first cycle type signal and said first status signal, and wherein said bus arbiter is configured to grant ownership of said second bus to said local interface depending upon said second cycle type signal and said first status signal.

6. The computer system as recited in claim 5 wherein said bus arbiter is configured to deny ownership of said first bus to said host interface if said first cycle type signal indicates that a transfer is pending that involves said data queue and if said first status signal indicates that the data queue is unavailable to participate in said transfer.

7. The computer system as recited in claim 5 wherein said host interface is configured to assert a bus request signal for requesting ownership of said first bus concurrently with generating said first cycle type signal.

8. The computer system as recited in claim 5 wherein said bus arbiter is configured such that arbitration of said first bus is based upon an availability of said data queue and upon said first cycle type signal.

* * * * *